US012745784B1

(12) United States Patent
Li et al.

(10) Patent No.: US 12,745,784 B1
(45) Date of Patent: Sep. 29, 2026

(54) TRAY AND COLD DRINK MAKING DEVICE

(71) Applicant: Zhuhai Yingweituo Technology Co., Ltd., Zhuhai (CN)

(72) Inventors: Yisheng Li, Zhuhai (CN); Baosheng Zhang, Zhuhai (CN)

(73) Assignee: Zhuhai Yingweituo Technology Co., Ltd., Zhuhai (CN)

( * ) Notice: Subject to any disclaimer, the term of this patent is extended or adjusted under 35 U.S.C. 154(b) by 0 days.

(21) Appl. No.: 19/418,778

(22) Filed: Dec. 12, 2025

(30) Foreign Application Priority Data

Sep. 22, 2025 (CN) ......................... 202522043554.6

(51) Int. Cl.
*A23G 9/28* (2006.01)

(52) U.S. Cl.
CPC .................................... *A23G 9/281* (2013.01)

(58) Field of Classification Search
CPC ................................ A23G 9/285; A23G 9/281
See application file for complete search history.

(56) References Cited

U.S. PATENT DOCUMENTS 2,363,474 A * 11/1944 Schlesinger ....... B65D 83/0094 222/184
2,627,237 A * 2/1953 Angell ................... A23G 9/286 83/411.5
2,794,627 A * 6/1957 Rodwick ............... A47J 43/046 366/205
3,175,594 A * 3/1965 Jepson .................. A47J 43/046 366/205
4,452,823 A * 6/1984 Connolly ................. A23G 9/44 426/115
4,505,408 A * 3/1985 Sagol ..................... B65D 90/14 108/127
5,085,205 A * 2/1992 Hall .......................... F24H 9/17 122/504
5,695,089 A * 12/1997 Reese ..................... B28B 19/00 220/567.2
5,752,617 A * 5/1998 Yung ...................... B65D 90/24 220/4.12
5,954,103 A * 9/1999 Smith .................. B65D 90/105 141/86
6,085,645 A * 7/2000 Huang ................... A23G 9/285 366/144
7,328,788 B2 * 2/2008 Mahieu ................. A61L 12/086 220/729
7,850,043 B2 * 12/2010 Foster ................. B05B 11/0056 222/207
8,087,547 B1 * 1/2012 Lindsey ................. B65D 35/56 222/173

(Continued)

FOREIGN PATENT DOCUMENTS

CN 118442732 A * 8/2024 ............... A23G 9/12

*Primary Examiner* — Frederick C Nicolas
(74) *Attorney, Agent, or Firm* — Buchalter; Jason W. Croft

(57) ABSTRACT

A tray and a cold drink making device are disclosed. The cold drink making device includes a container and a tray body. The tray body is provided with a liquid storage tank with an upward opening, the tray body is provided with a first snap-fit structure, an outer peripheral wall of the container is provided with a second snap-fit structure, and the first snap-fit structure cooperates with the second snap-fit structure such that the tray body is capable of being in snap fit with the container. This design provides a compact structure, and is convenient and reliable to use.

5 Claims, 7 Drawing Sheets

(56) References Cited

U.S. PATENT DOCUMENTS

| | | | | |
|---|---|---|---|---|
| 8,998,037 | B2 * | 4/2015 | Cahen | A47J 31/4482 222/173 |
| 9,527,634 | B2 * | 12/2016 | Stryker | B44D 3/127 |
| 10,004,250 | B2 * | 6/2018 | Ugolini | A23G 9/281 |
| 10,306,905 | B2 * | 6/2019 | Cocchi | A23G 9/281 |
| 10,321,700 | B2 * | 6/2019 | Cocchi | A23G 9/30 |
| 12,279,629 | B1 * | 4/2025 | Lerman | A23G 9/045 |
| 12,414,578 | B1 * | 9/2025 | Weinstock | A23G 9/28 |
| 12,446,594 | B2 * | 10/2025 | Roberts | A23G 9/045 |
| 12,514,262 | B1 * | 1/2026 | Long | A23G 9/224 |
| 12,520,857 | B1 * | 1/2026 | Adams | A23G 9/283 |
| 2009/0140006 | A1 * | 6/2009 | Vitantonio | B67D 1/1466 222/399 |
| 2019/0124944 | A1 * | 5/2019 | Caiano | A23G 9/20 |
| 2025/0234886 | A1 * | 7/2025 | Lerman | A23G 9/12 |

* cited by examiner

TRAY AND COLD DRINK MAKING DEVICE

CROSS-REFERENCE TO RELATED APPLICATION

This application is based on and claims the benefit of priority from Chinese Patent Application No. 2025220435546, filed on 22 Sep. 2025, the entirety of which is incorporated by reference herein.

TECHNICAL FIELD

The present disclosure relates to the technical field of cold drink making equipment, and in particular, to a tray and a cold drink making device.

BACKGROUND

Existing horizontal cold drink making devices usually include a base, a container, a refrigeration module and a tray. The refrigeration module is provided with an evaporator, which is horizontally arranged on the base, and the container may be sleeved over the evaporator to form a refrigeration stirring cavity between the inner wall of the container and the outer wall of the evaporator. The cold drink making device may also be provided with a stirring member in a refrigeration stirring cavity. The user adds milk, wine, syrup, water and other liquids into the refrigeration stirring cavity. After refrigeration by the evaporator and stirring by the stirring member, the liquid may form smoothies, ice cream, etc.

Condensed water is generated during the operation of the refrigeration module and needs to be drained into the tray for storage through a conduit. In addition, condensed water may also be formed on the outer surface of the container. Therefore, a slot with an insertion opening will be defined between the bottom wall of the horizontally-placed container and the base, and the tray may be inserted into the slot from the insertion opening, to receive the condensed water dripping from the outer surface of the container. However, in actual use, once the amount of water in the tray reaches a certain level, there is a risk that when the user pulls the tray out of the slot or removes the container from the evaporator, the container and the tray may collide, causing the water in the tray to spill. If the water spills onto the base, it may damage the electronic components mounted on the base.

SUMMARY

The present disclosure aims to solve at least one of the technical problems in the existing technologies. To this end, the present disclosure provides a tray and a cold drink making device, which have a compact structure and are convenient and reliable to use.

According to an embodiment of a first aspect of the present disclosure, a tray includes a tray body provided with a liquid storage tank with an upward opening; and a first snap-fit structure arranged on the tray body, where the first snap-fit structure is configured to cooperate with a second snap-fit structure on a container in a cold drink making device such that the tray body is capable of being in snap fit with the container.

According to the embodiment of the present disclosure, the tray has at least the following beneficial effects.

In the present disclosure, the tray is capable of being in snap fit with the container through cooperation between the first snap-fit structure and the second snap-fit structure on the container. When the amount of water stored in the tray is large, the user can first disassemble the container. Since the container and the tray are tightly engaged, the two are not likely to collide with each other and cause the water in the tray to pour out. After the container is disassembled, the user can disengage the first snap-fit structure from the second snap-fit structure to pour out the water in the tray. At this time, since there is no electronic component in the container, the electronic component will not be damaged. This design provides a compact structure, and is convenient and reliable to use.

According to some embodiments of the present disclosure, the first snap-fit structure includes two clamping strips, the two clamping strips are located on both sides of the tray body respectively and extend along a length direction of the tray body, and the two clamping strips protrude toward each other or away from each other.

According to some embodiments of the present disclosure, the first snap-fit structure includes a first buckle and a second buckle that are arranged on the tray body, the first buckle and the second buckle protrude toward each other or away from each other, the first buckle is movable relative to the tray body to have at least a first mating position in which the first buckle is capable of being engaged with the second snap-fit structure, and a second mating position in which the first buckle is capable of being disengaged from the second snap-fit structure, the first buckle is provided with a reset member, the reset member is configured to bias the first buckle toward the first mating position, the first buckle is provided with a driven part, and when a force is applied to the driven part, the first buckle is displaced toward the second mating position.

According to some embodiments of the present disclosure, the first snap-fit structure includes an L-shaped clamping groove.

According to an embodiment of a second aspect of the present disclosure, a cold drink making device includes a container and a tray body, where the tray body is provided with a liquid storage tank with an upward opening, the tray body is provided with a first snap-fit structure, an outer peripheral wall of the container is provided with a second snap-fit structure, and the first snap-fit structure cooperates with the second snap-fit structure such that the tray body is capable of being in snap fit with the container.

According to the embodiment of the present disclosure, the cold drink making device has at least the following beneficial effects.

According to the cold drink making device of the present disclosure, the tray is capable of being in snap fit with the container through cooperation between the first snap-fit structure and the second snap-fit structure on the container. When the amount of water stored in the tray is large, the user can first disassemble the container. Since the container and the tray are tightly engaged, the two are not likely to collide with each other and cause the water in the tray to pour out. After the container is disassembled, the user can disengage the first snap-fit structure from the second snap-fit structure to pour out the water in the tray. At this time, since there is no electronic component in the container, the electronic component will not be damaged. This design provides a compact structure, and is convenient and reliable to use.

According to some embodiments of the present disclosure, the first snap-fit structure includes two clamping strips, the two clamping strips are located on both sides of the tray body respectively and extend along a length direction of the tray body, and the two clamping strips protrude toward each other or away from each other. The second snap-fit structure includes two grooves, the two grooves are located on both sides of the container respectively and extend in a length direction of the container, and the clamping strips are movable to be inserted into the respective grooves from head ends thereof, such that the clamping strips are engaged with the respective grooves.

According to some embodiments of the present disclosure, the tray body is provided with a limiting block at an end of each of the clamping strips, and the limiting block is capable of abutting against a wall surface of the container to limit the respective clamping strip moving in the length direction of the respective groove.

According to some embodiments of the present disclosure, the first snap-fit structure includes a first buckle and a second buckle that are arranged on the tray body, where the first buckle and the second buckle protrude toward each other or away from each other; and the second snap-fit structure includes a first engagement port and a second engagement port that are arranged on the container, the second buckle is capable of being engaged with the second engagement port, the first buckle is movable relative to the tray body to have at least a first mating position in which the first buckle is capable of being engaged with the second snap-fit structure, and a second mating position in which the first buckle is capable of being disengaged from the second snap-fit structure, the first buckle is provided with a reset member, the reset member is configured to bias the first buckle toward the first mating position, the first buckle is provided with a driven part, and when a force is applied to the driven part, the first buckle is displaced toward the second mating position. Alternatively, the second snap-fit structure includes a first buckle and a second buckle that are arranged on the container, where the first buckle and the second buckle protrude toward each other or away from each other, the first snap-fit structure includes a first engagement port and a second engagement port which are arranged on the tray body, the second buckle is capable of being engaged with the second engagement port, the first buckle is movable relative to the container to have at least a first mating position in which the first buckle is capable of being engaged with the second snap-fit structure, and a second mating position in which the first buckle is capable of being disengaged from the second snap-fit structure, the first buckle is provided with a reset member, the reset member is configured to bias the first buckle toward the first mating position, the first buckle is provided with a driven part, and when a force is applied to the driven part, the first buckle is displaced toward the second mating position.

According to some embodiments of the present disclosure, the tray body is provided with a containing box protruding from an inner wall of the liquid storage tank, a containing cavity is formed in the containing box, the first buckle is movably arranged in the containing cavity, the containing box is provided with a movable opening, the movable opening is in communication with the containing cavity and the liquid storage tank, the first buckle is capable of extending out from the movable opening to the liquid storage tank, and a wall surface of the tray body is provided with a gap in communication with the containing cavity to expose the driven part.

According to some embodiments of the present disclosure, the first snap-fit structure includes an L-shaped clamping groove, the second snap-fit structure includes a clamping block, and the clamping block is capable of entering the clamping groove from an opening thereof and is engaged with the clamping groove. Alternatively, the second snap-fit structure includes an L-shaped clamping groove, the first snap-fit structure includes a clamping block, and the clamping block is capable of entering the clamping groove from an opening thereof and is engaged with the clamping groove.

Additional aspects and advantages of the present disclosure will be set forth in part in the description which follows and, in part, will be obvious from the description which follows, or may be learned by practice of the present disclosure.

BRIEF DESCRIPTION OF DRAWINGS

The above and/or additional aspects and advantages of the present disclosure will become apparent and readily understood from the description of the embodiments with reference to the following drawings, in which.

REFERENCE NUMERALS

Figure 1:
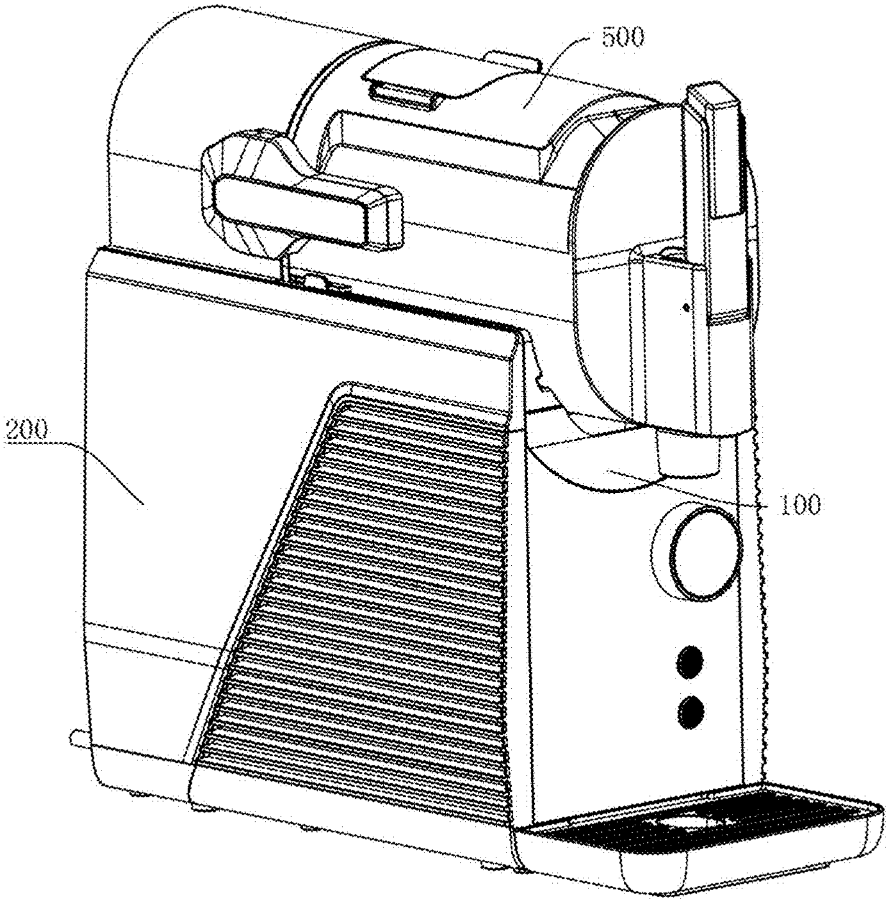
FIG. 1 is a perspective schematic diagram of a cold drink making device according to an embodiment of the present disclosure.

Tray body 100; liquid storage tank 110; support 120; clamping strip 130; limiting block 131; first buckle 140; reset member 141; driven part 142; containing box 143; containing cavity 144; movable opening 145; gap 146; second buckle 150; clamping groove 160; base 200; evaporator 300; stirring member 400; container 500; boss 510; groove 520; first engagement port 530; second engagement port 540; clamping block 550.

DETAILED DESCRIPTION

Embodiments of the present disclosure will be described in detail hereinafter in conjunction with accompanying drawings in which the same or like reference numerals refer to the same or like elements or elements having the same or like functions throughout. The embodiments described below by reference to the accompanying drawings are illustrative and are intended for illustrating only and are not to be construed as limiting the present disclosure.

In the description of the present disclosure, it should be understood that for the description of orientations, the orientation or positional relationships indicated by the terms such as "on," "below," "front," "rear," "left," "right," "vertical," "horizontal," "top," "bottom," "inner," "outer" and the like are based on orientation or positional relationships shown in the accompanying drawings, and are used only for ease and brevity of illustration and description, rather than indicating or implying that the mentioned apparatus or element must have a particular orientation or must be constructed and operated in a particular orientation. Therefore, such terms should not be construed as limiting the present disclosure.

It should be understood that in the description of the embodiments of the present disclosure, the term "at least one" means one or more, the term "plurality of" (or multiple) means at least two, the term such as "greater than," "less than," "exceed" or variants thereof prior to a number or series of numbers is understood to not include the number adjacent to the term. The term "at least" prior to a number or series of numbers is understood to include the number adjacent to the term "at least", and all subsequent numbers or integers that could logically be included, as clear from context. If used herein, the terms such as "first," "second" and the like are merely used for distinguishing technical features, and are not intended to indicate or imply relative importance, or implicitly point out the number of the indicated technical features, or implicitly point out the precedence order of the indicated technical features.

In the present disclosure, unless specified or limited otherwise, the terms "mounted," "connected," "coupled" and the like are used broadly, and may be, for example, fixed connections, detachable connections, or integral connections; may also be mechanical connections, or electric connections; may also be direct connections, or indirect connections via intervening structures; may also be inner communications or interaction of two elements. The specific meaning of the above terms within the present disclosure may be understood by those having ordinary skills in the art according to particular circumstances.

As shown in FIG. 1 to FIG. 10, a tray according to an embodiment of a first aspect of the present disclosure includes a tray body 100. The tray body 100 is provided with a liquid storage tank 110 with an upward opening, and a first snap-fit structure is arranged on the tray body, and is configured to cooperate with a second snap-fit structure on a container 500 in a cold drink making device such that the tray body 100 is capable of being in snap fit with the container 500.

Figure 2:
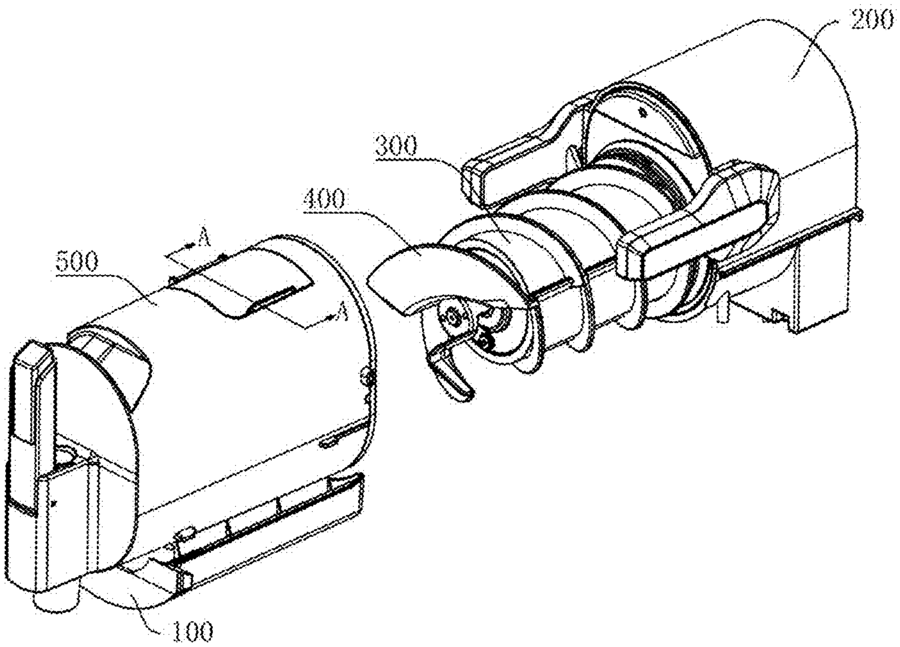
FIG. 2 is a schematic diagram showing assembly of a container and an evaporator of the cold drink making device according to a first embodiment of the present disclosure.

The tray body 100 is applied to the cold drink making device, as shown in FIG. 1 and FIG. 2, the cold drink making device typically includes a base 200, a container 500 and a refrigeration module. The refrigeration module may include a compressor, a condenser and an evaporator 300. The compressor compresses a refrigerant, and the condenser causes the refrigerant to release heat and cool down, the refrigerant with a lower temperature is sent into the evaporator 300. The evaporator 300 is rod-shaped. The container 500 is capable of being adapted to the shape of the evaporator 300 and sleeved over the evaporator 300. A refrigeration stirring cavity is formed between the inner wall of the container 500 and the outer wall of the evaporator 300. The compressor, the condenser and a controller are all arranged on the base 200 outside the refrigeration stirring cavity. The cold drink making device is provided with a stirring member 400 in the refrigeration stirring cavity. The user adds milk, wine, syrup, water and other liquids into the refrigeration stirring cavity, and after refrigeration by the evaporator 300 and stirring by the stirring member 400, the liquid may form smoothies, ice cream, etc. The refrigeration module may also use semiconductor chilling plates, etc., where the cold ends of the semiconductor chilling plates are located in the container 500, while the hot ends of the semiconductor chilling plates are located outside the container 500. The condensed water formed by the refrigeration module during operation is capable of being transferred to the liquid storage tank 110 of the tray body 100 through a conduit. The tray body 100 may also be arranged below the container 500, an opening of the liquid storage tank 110 is close to the outer surface of the container 500, and the condensed water is capable of dripping to the opening of the liquid storage tank 110 to be stored in the liquid storage tank 110.

Specifically, the container 500 may be in the shape of a cylinder, and the tray body 100 may also be in the shape of an arc at the opening of the liquid storage tank 110 to fit closely with the outer surface of the container 500. The container 500 may also be in the shape of a prism or other shapes, and the tray body 100 is configured with a suitable shape at the opening of the liquid storage tank 110 to match it.

In the present disclosure, the tray is capable of being in snap fit with the container 500 through cooperation between the first snap-fit structure and the second snap-fit structure on the container 500. When the amount of water stored in the tray is large, the user can first disassemble the container 500. Since the container 500 and the tray are tightly engaged, the two are not likely to collide with each other and cause the water in the tray to pour out. After the container 500 is disassembled, the user can disengage the first snap-fit structure from the second snap-fit structure to pour out the water in the tray. At this time, since there is no electronic component in the container 500, the electronic component will not be damaged. This design provides a compact structure, and is convenient and reliable to use.

Figure 3:
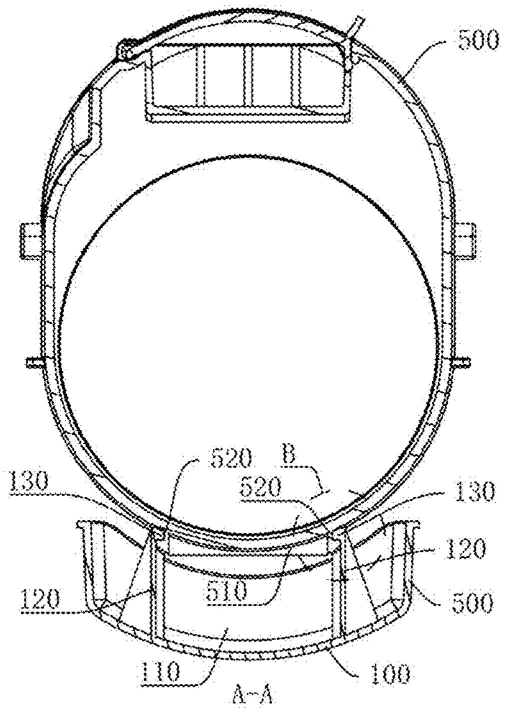
FIG. 3 is a cross-sectional view of section A-A of the cold drink making device in FIG. 2 according to the first embodiment of the present disclosure.
Figure 4:
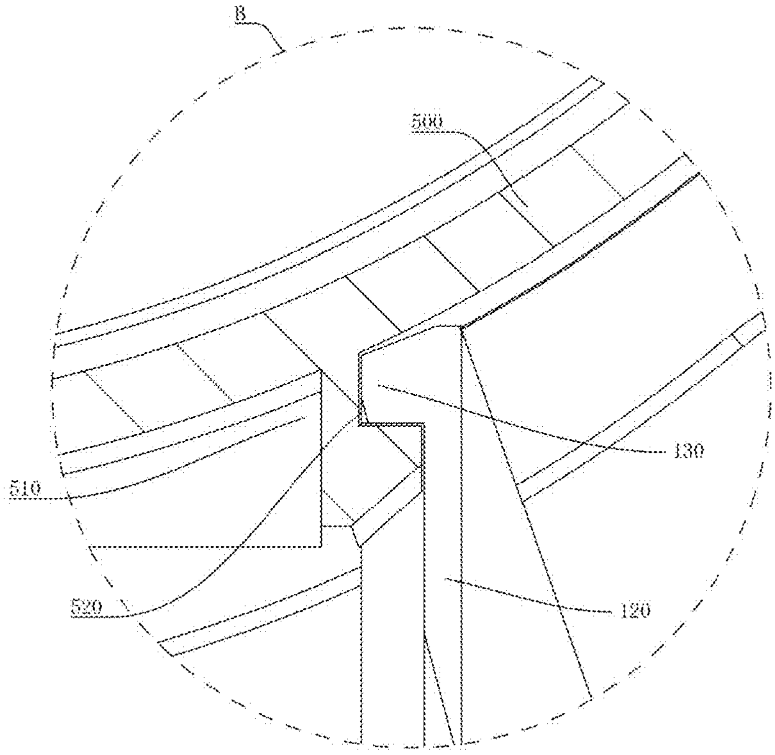
FIG. 4 is an enlarged schematic diagram of a portion B of the cold drink making device in FIG. 3 according to the first embodiment of the present disclosure.
Figure 5:
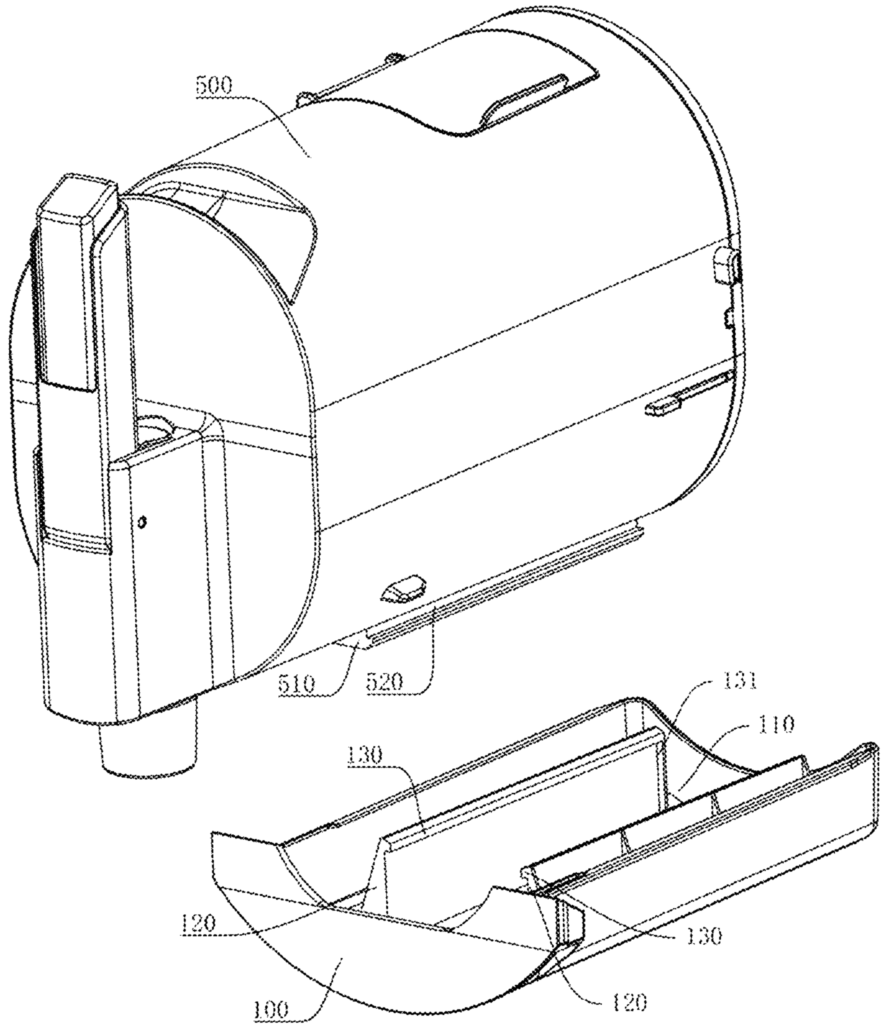
FIG. 5 is a schematic diagram showing assembly of a tray and the container of the cold drink making device according to the first embodiment of the present disclosure.

In some embodiments of the present disclosure, as shown in FIG. 3 to FIG. 5, the first snap-fit structure includes two clamping strips 130, the two clamping strips 130 are located on both sides of the tray body 100 respectively and extend along a length direction of the tray body 100, and the two clamping strips 130 protrude toward each other or away from each other.

By using the two clamping strips 130 extending along the length direction of the tray body 100 to be in snap fit with the second snap-fit structure of the container 500, the weight of the tray body 100 is capable of being better supported. Specifically, the clamping strips 130 may be arranged on the inner groove wall of the liquid storage tank 110 on the tray body 100 and protrude toward each other. The clamping strips 130 may also be arranged on the outer side wall of the tray body 100 and protrude away from each other. Alternatively, the tray body 100 may be provided with a support 120 in the liquid storage tank 110, and the clamping strips 130 are arranged on the support 120.

Figure 6:
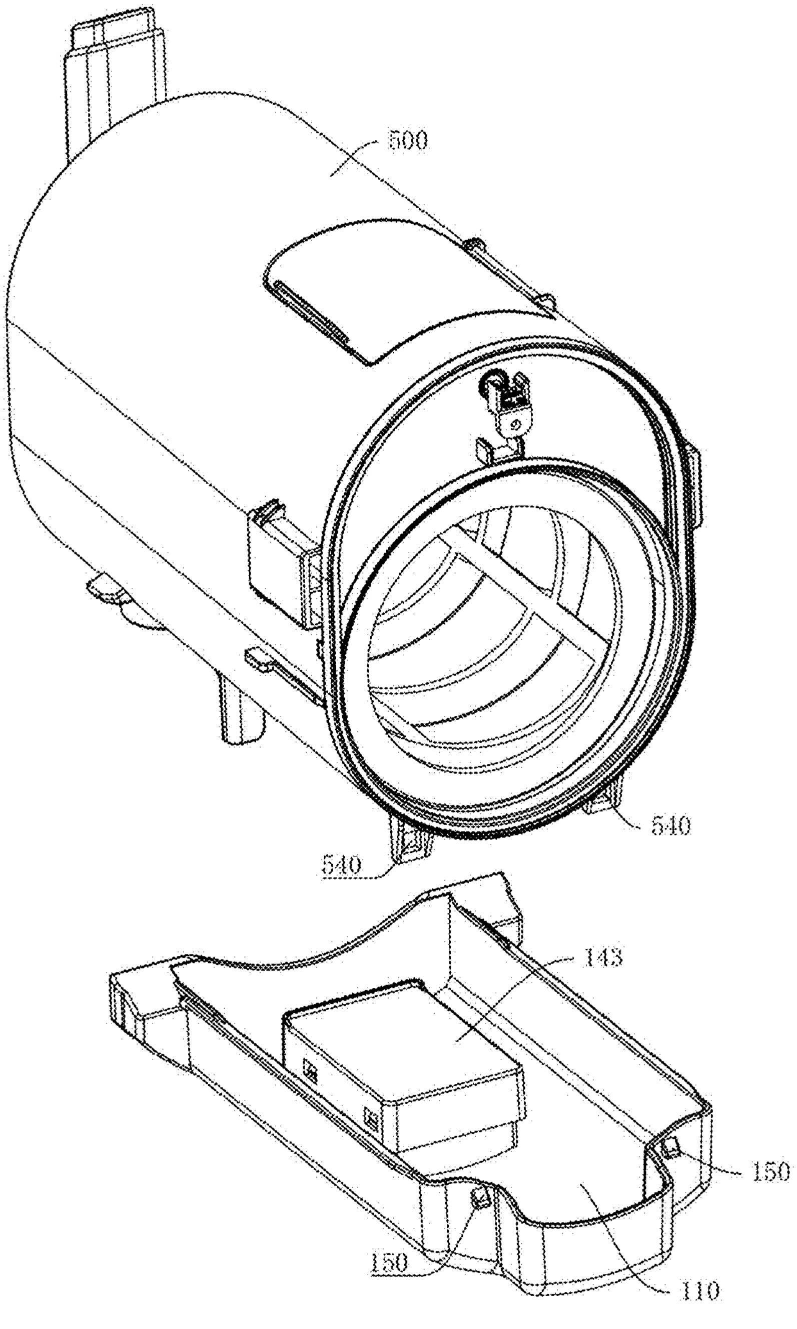
FIG. 6 is a schematic diagram showing assembly of the tray and the container of the cold drink making device according to a second embodiment of the present disclosure.
Figure 7:
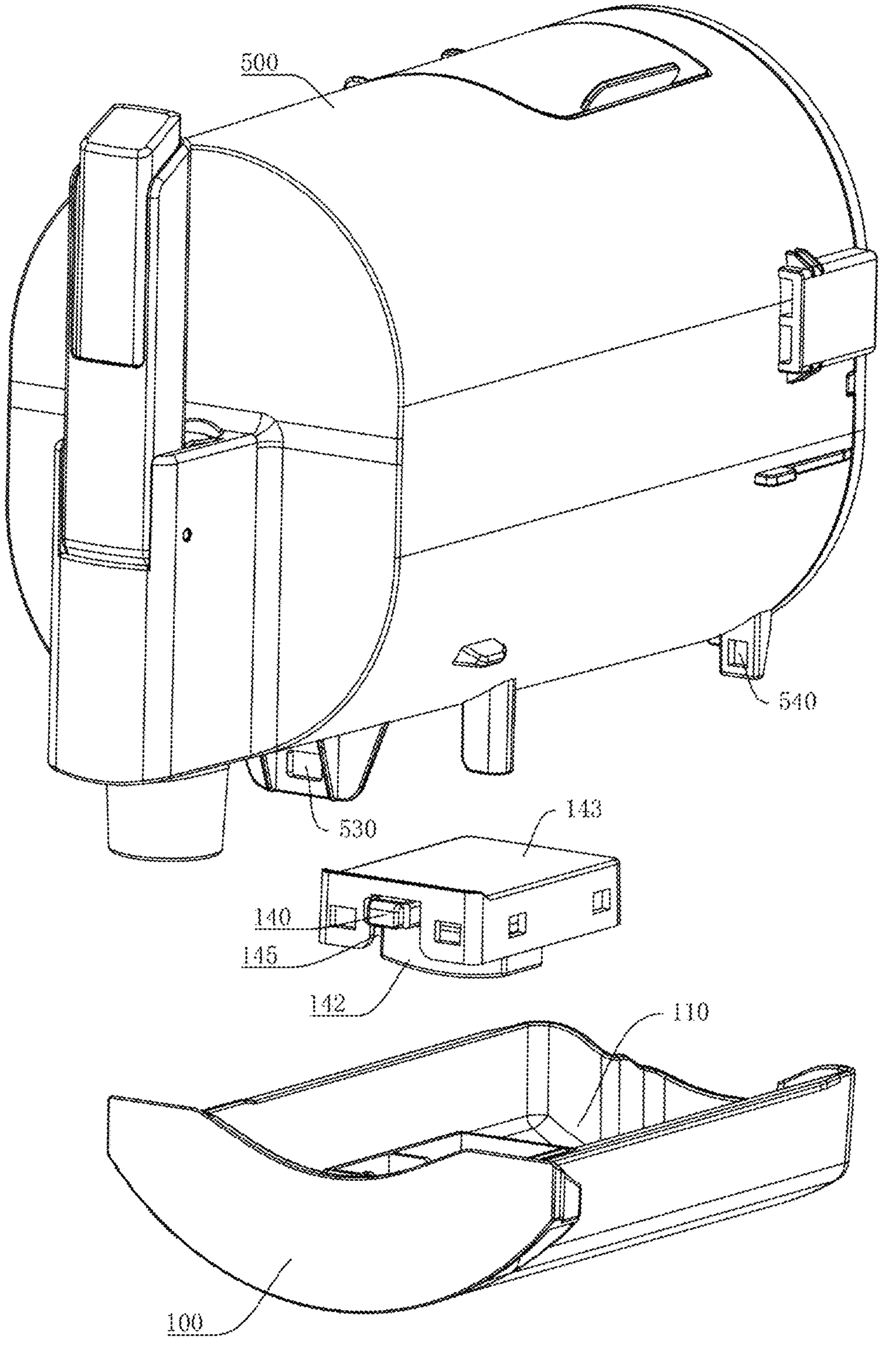
FIG. 7 is an exploded view of a first snap-fit structure of the cold drink making device according to the second embodiment of the present disclosure.
Figure 8:
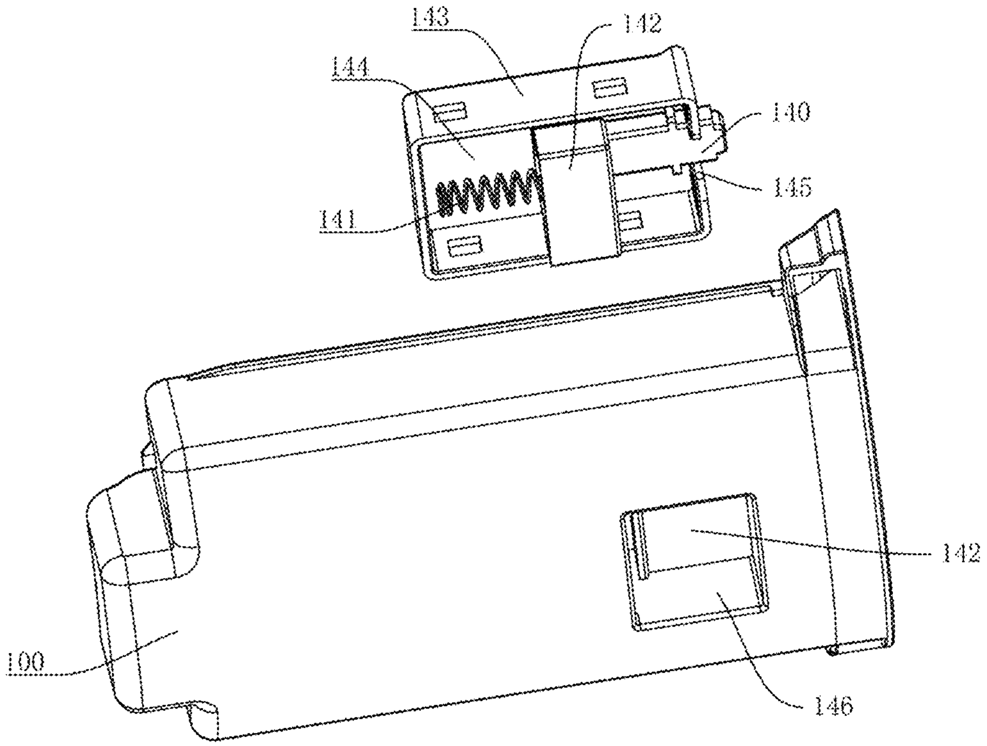
FIG. 8 is a schematic internal view of the first snap-fit structure of the cold drink making device according to the second embodiment of the present disclosure.

According to some embodiments of the present disclosure, as shown in FIG. 6 to FIG. 8, the first snap-fit structure includes a first buckle 140 and a second buckle 150, both of which are arranged on the tray body 100, the first buckle 140 and the second buckle 150 protrude toward each other or away from each other, the first buckle 140 is movable relative to the tray body 100 to have at least a first mating position and a second mating position. In the first mating position, the first buckle 140 is capable of being engaged with the second snap-fit structure, in the second mating position, the first buckle 140 is capable of being disengaged from the second snap-fit structure. The first buckle 140 is provided with a reset member 141, the reset member 141 is configured to bias the first buckle 140 toward the first mating position, and the first buckle 140 is provided with a driven part 142, and when a force is applied to the driven part 142, the first buckle 140 is displaced toward the second mating position.

The first buckle 140 and the second buckle 150 are capable of protruding toward each other or away from each other to be respectively engaged with the second snap-fit structure. Under the action of the reset member 141, the first buckle 140 is maintained in the first mating position, such that the tray body 100 is tightly connected to the container 500. When it is necessary to disassemble the tray body 100 from the container 500, the user can apply force to the driven part 142, the first buckle 140 is forced to move to the second mating position, the first buckle 140 is disengaged from the second snap-fit structure, then a space for movement is provided to the tray body 100 to enable the second buckle 150 to also be disengaged from the second snap-fit structure, and the tray body 100 and the container 500 are separated accordingly. Specifically, the reset member 141 may be an elastic member such as a spring, a torsion spring, or a rubber column. One end of the elastic member is arranged on the tray body 100, and the other end of the elastic member abuts against the first buckle 140 to drive the first buckle 140 to tend to move to the first mating position. The reset member 141 may also be a counterweight block. The counterweight block is arranged on the first buckle 140. Under the action of gravity, the first buckle 140 tends to move to the first mating position.

Figure 9:
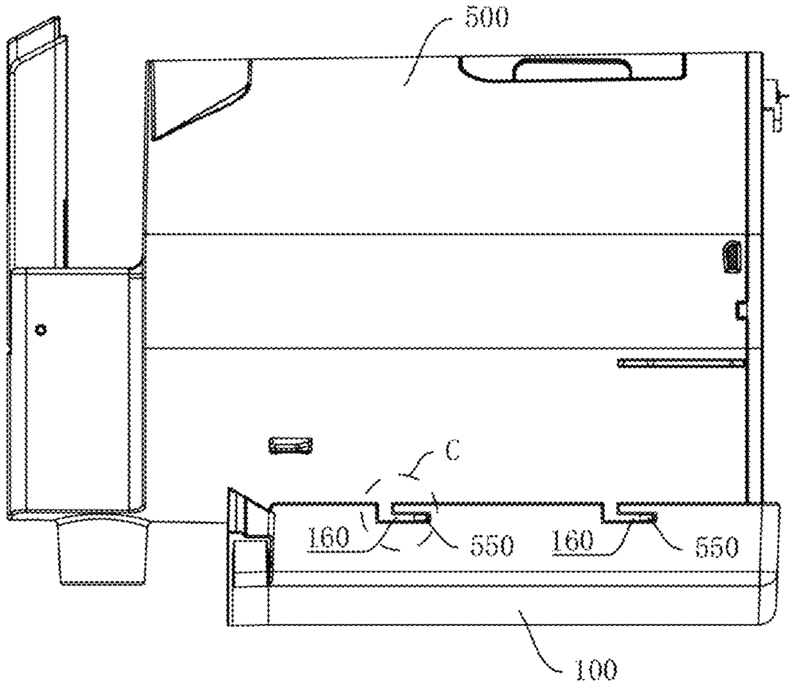
FIG. 9 is a side view of the tray and the container of the cold drink making device according to a third embodiment of the present disclosure.
Figure 10:
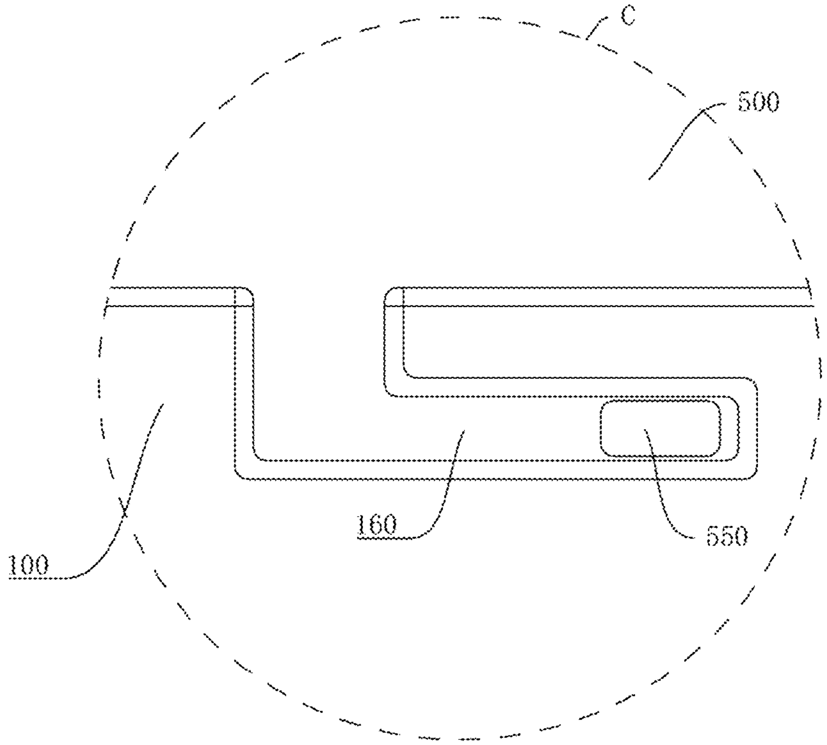
FIG. 10 is an enlarged schematic diagram of a portion C of the cold drink making device according to the third embodiment of the present disclosure in FIG. 9.

In some embodiments of the present disclosure, as shown in FIG. 9 and FIG. 10, the first snap-fit structure includes an L-shaped clamping groove 160.

The second snap-fit structure may be clamping blocks 550 arranged on the container 500. There are multiple clamping grooves 160 on the tray body 100 and multiple clamping blocks 550 on the container 500, and they correspond one to one. The clamping blocks 550 are capable of entering the respective clamping grooves 160 from the openings of the "L"-shaped clamping grooves 160. The container 500 and the tray body 100 are made to move relative to each other, such that the clamping blocks 550 move away from the respective openings along the clamping grooves 160 to be engaged with the clamping grooves 160. When it is necessary to disassemble the tray body 100 from the container 500, the container 500 and the tray body 100 are made to move relative to each other, such that the clamping blocks 550 move toward the respective openings along the clamping grooves 160 and are disengaged from the openings, thereby separating the tray body 100 from the container 500.

As shown in FIG. 1 to FIG. 10, a cold drink making device according to an embodiment of a second aspect of the present disclosure includes a container 500 and a tray body 100. The tray body 100 is provided with a liquid storage tank 110 with an upward opening, the tray body 100 is provided with a first snap-fit structure, an outer peripheral wall of the container 500 is provided with a second snap-fit structure, and the first snap-fit structure cooperates with the second snap-fit structure such that the tray body 100 is capable of being in snap fit with the container 500.

According to the cold drink making device in the present disclosure, the tray is capable of being in snap fit with the container 500 through cooperation between the first snap-fit structure and the second snap-fit structure on the container 500. When the amount of water stored in the tray is large, the user can first disassemble the container 500. Since the container 500 and the tray are tightly engaged, the two are not likely to collide with each other and cause the water in the tray to pour out. After the container 500 is disassembled, the user can disengage the first snap-fit structure from the second snap-fit structure to pour out the water in the tray. At this time, since there is no electronic component in the container 500, the electronic component will not be damaged. This design provides a compact structure, and is convenient and reliable to use.

In some embodiments of the present disclosure, as shown in FIG. 3 to FIG. 5, the first snap-fit structure includes two clamping strips 130, the two clamping strips 130 are located on both sides of the tray body 100 respectively and extend along a length direction of the tray body 100, and the two clamping strips 130 protrude toward each other or away from each other. The second snap-fit structure includes two grooves 520, the two grooves 520 are located on both sides of the container respectively and extend in a length direction of the container 500, and the clamping strips 130 are movable to be inserted into the respective grooves 530 from respective head ends thereof, such that the clamping strips 130 and the grooves 520 are engaged.

A boss 510 may be arranged below the container 500, and the grooves 520 are formed in both sides of the boss 510. The clamping strips 130 may be arranged on a wall surface of the tray body 100, or supports 120 protruding from the inner wall of the liquid storage tank 110 are arranged in the liquid storage tank 110 of the tray body 100, such that there is a gap between the opening of the liquid storage tank 110 of the tray body 100 and the outer wall surface of the container 500 to facilitate condensed water to enter the liquid storage tank 110. Specifically, two supports 120 may be provided, and the clamping strips 130 are arranged on the supports 120 respectively. Taking the two clamping strips 130 protruding toward each other as an example, the clamping strips 130 are inserted into the grooves from the head ends thereof respectively and move along the length direction of the grooves 520, such that the clamping strips 130 and the grooves 520 are engaged finally.

In some embodiments of the present disclosure, as shown in FIG. 5, the tray body 100 is provided with a limiting block 131 at an end of each of the clamping strips 130, and the limiting block 131 is capable of abutting against a wall surface of the container 500 to limit the respective clamping strip 130 moving in the length direction of the respective groove 520.

When the clamping strips 130 move along the length direction of the grooves 520 to the tail ends of the grooves 520, the limiting blocks 131 are capable of abutting against the wall surface of the container 500 to prevent further movement of the clamping strips 130. Specifically, the limiting blocks 131 are capable of abutting against the end wall of the boss 510, thereby enabling the tray body 100 to be positioned substantially directly below the container 500. Moreover, during the process of disassembling or installing the container 500, the tray body 100 will not fall off from the tail ends of the grooves 520, thus ensuring a stable and reliable connection.

In some embodiments of the present disclosure, as shown in FIG. 6 to FIG. 8, the first snap-fit structure includes a first buckle 140 and a second buckle 150, both of which are arranged on the tray body 100, and the first buckle 140 and the second buckle 150 protrude toward each other or away from each other. The second snap-fit structure includes a first engagement port 530 and a second engagement port 540 which are arranged on the container 500. The second buckle 150 is capable of being engaged with the second engagement port 540. The first buckle 140 is movable relative to the tray body 100 to have at least a first mating position and a second mating position. In the first mating position, the first buckle 140 is capable of being engaged with the first engagement port 530, and in the second mating position, the first buckle 140 is capable of being disengaged from the first engagement port 530. The first buckle 140 is provided with a reset member 141, the reset member 141 is configured to bias the first buckle 140 toward the first mating position, the first buckle 140 is provided with a driven part 142, and when a force is applied to the driven part 142, the first buckle 140 is displaced toward the second mating position.

Alternatively, the second snap-fit structure includes a first buckle 140 and a second buckle 150, both of which are arranged on the container 500, where the first buckle 140 and the second buckle 150 protrude toward each other or away from each other. The first snap-fit structure includes a first engagement port 530 and a second engagement port 540 which are arranged on the tray body 100, the second buckle 150 is capable of being engaged with the second engagement port 540, the first buckle 140 is movable relative to the container 500 to have at least a first mating position and a second mating position. In the first mating position, the first buckle 140 is capable of being engaged with the first engagement port 530, and in the second mating position, the first buckle 140 is capable of being disengaged from the first engagement port 530. The first buckle 140 is provided with a reset member 141, the reset member 141 is configured to bias the first buckle 140 toward the first mating position. The first buckle 140 is provided with a driven part 142, and when a force is applied to the driven part 142, the first buckle 140 is displaced toward the second mating position.

Taking the first snap-fit structure including the first buckle 140 and the second buckle 150 as an example, a plurality of ribs may be provided at the bottom of the container 500, the first engagement port 530 and the second engagement port 540 are correspondingly disposed on the ribs. The second buckle 150 may be fixedly arranged on the wall surface of the tray body 100, or may alternatively be movably mounted to the tray body 100 in a manner similar to the first buckle 140. When it is necessary to disassemble the tray body 100 from the container 500, the user can apply a force to the driven part 142, thereby causing the first buckle 140 to be displaced to the second mating position and disengaged from the first engagement port 530. A space is then provided for movement of the tray body 100 to enable the second buckle 150 to also be disengaged from the second engagement port 540, thereby allowing the tray body 100 and the container 500 to be separated.

In some embodiments of the present disclosure, as shown in FIG. 6, FIG. 7 and FIG. 8, the tray body 100 is provided with a containing box 143 protruding from the inner wall of the liquid storage tank 110, a containing cavity 144 is formed in the containing box 143. The first buckle 140 is movably arranged in the containing cavity 144. The containing box 143 is provided with a movable opening 145, the movable opening 145 is in communication with the containing cavity 144 and the liquid storage tank 110. The first buckle 140 is capable of extending out from the movable opening 145 to the liquid storage tank 110, and the wall surface of the tray body 100 is provided with a gap 146 communicated with the containing cavity 144 to expose the driven part 142.

The containing box 143 may be arranged on the inner wall of the liquid storage tank 110 and protrude from the inner wall. Even if condensed water is stored in the liquid storage tank 110, the liquid level is not likely to be higher than the position of the movable opening 145, thereby preventing the liquid from leaking through the movable opening 145, the containing cavity 144 and the gap 146. The gap 146 is usually located on the bottom surface of the tray body 100 so that the user can readily apply force to the driven part 142 to detach the tray body 100.

In some embodiments of the present disclosure, as shown in FIG. 9 and FIG. 10, the first snap-fit structure includes an L-shaped clamping groove 160, the second snap-fit structure includes a clamping block 550, and the clamping block 550 is capable of entering the clamping groove 160 from an opening thereof and is engaged with the clamping groove 160.

Alternatively, the second snap-fit structure includes L-shaped clamping groove 160, the first snap-fit structure includes a clamping block 550, and the clamping block 550 is capable of entering the clamping groove 160 from an opening thereof and is engaged with the clamping groove 160.

Taking the first snap-fit structure including the L-shaped clamping groove 160, and the second snap-fit structure including the clamping block 550 as an example, the clamping block 550 is capable of entering the clamping groove 160 from the opening of the "L"-shaped clamping groove 160. The container 500 and the tray body 100 are made to move relative to each other, such that the clamping block 550 moves away from the opening along the clamping groove 160 to be engaged with the clamping groove 160. When it is necessary to disassemble the tray body 100 from the container 500, the container 500 and the tray body 100 are made to move relative to each other, such that the clamping block 550 moves toward the opening along the clamping groove 160 and is disengaged from the opening, thereby separating the tray body 100 from the container 500.

The technical features of the above-mentioned embodiments can be combined in any manner. In order to make the description concise, not all possible combinations of the technical features in the above-mentioned embodiments are described. However, as long as there is no contradiction in the combination of these technical features, they should be considered to be within the scope of this specification.

Although embodiments of the present disclosure have been shown and described, it will be understood by those of ordinary skills in the art that various changes, modifications, substitutions, and variations can be made to these embodiments without departing from the gist of the present disclosure, the scope of which is defined by the claims and their equivalents.

What is claimed is:

1. A tray, comprising:

a tray body provided with a liquid storage tank with an upward opening;

a first snap-fit structure arranged on the tray body, wherein the first snap-fit structure is configured to cooperate with a second snap-fit structure on a container in a cold drink making device such that the tray body is capable of being in snap fit with the container;

wherein the first snap-fit structure comprises a first buckle and a second buckle that are arranged on the tray body, the first buckle and the second buckle protrude toward each other or away from each other, the first buckle is movable relative to the tray body to have at least a first mating position in which the first buckle is capable of being engaged with the second snap-fit structure, and a second mating position in which the first buckle is capable of being disengaged from the second snap-fit structure, the first buckle is provided with a reset member, the reset member is configured to bias the first buckle toward the first mating position, the first buckle is provided with a driven part, and when a force is applied to the driven part, the first buckle is displaced toward the second mating position.

2. A cold drink making device, comprising a container and a tray body, wherein the tray body is provided with a liquid storage tank with an upward opening, the tray body is provided with a first snap-fit structure, an outer peripheral wall of the container is provided with a second snap-fit structure, and the first snap-fit structure cooperates with the second snap-fit structure such that the tray body is capable of being in snap fit with the container;

wherein the first snap-fit structure comprises two clamping strips, the two clamping strips are located on both sides of the tray body respectively and extend along a length direction of the tray body, the two clamping strips protrude toward each other or away from each other, the second snap-fit structure comprises two grooves, the two grooves are located on both sides of the container respectively and extend in a length direction of the container, and the clamping strips are movable to be inserted into the respective grooves from head ends of the respective grooves, such that the clamping strips are engaged with the respective grooves.

3. The cold drink making device according to claim 2, wherein the tray body is provided with a limiting block at an end of each of the clamping strips, and the limiting block is capable of abutting against a wall surface of the container to limit the respective clamping strip moving in the length direction of the respective groove.

4. A cold drink making device, comprising a container and a tray body, wherein the tray body is provided with a liquid storage tank with an upward opening, the tray body is provided with a first snap-fit structure, an outer peripheral wall of the container is provided with a second snap-fit structure, and the first snap-fit structure cooperates with the second snap-fit structure such that the tray body is capable of being in snap fit with the container;

wherein the first snap-fit structure comprises a first buckle and a second buckle that are arranged on the tray body, the first buckle and the second buckle protrude toward each other or protrude away from each other, the second snap-fit structure comprises a first engagement port and a second engagement port that are arranged on the container, the second buckle is capable of being engaged with the second engagement port, the first buckle is movable relative to the tray body to have at least a first mating position in which the first buckle is capable of being engaged with the second snap-fit structure, and a second mating position in which the first buckle is capable of being disengaged from the second snap-fit structure, the first buckle is provided with a reset member, the reset member is configured to bias the first buckle toward the first mating position, and the first buckle is provided with a driven part, and when a force is applied to the driven part, the first buckle is displaced toward the second mating position; or the second snap-fit structure comprises a first buckle and a second buckle that are arranged on the container, wherein the first buckle and the second buckle protrude toward each other or away from each other, the first snap-fit structure comprises a first engagement port and a second engagement port that are arranged on the tray body, the second buckle is capable of being engaged with the second engagement port, the first buckle is movable relative to the container to have at least a first mating position in which the first buckle is capable of being engaged with the second snap-fit structure, and a second mating position in which the first buckle is capable of being disengaged from the second snap-fit structure, the first buckle is provided with a reset member, the reset member is configured to bias the first buckle toward the first mating position, the first buckle is provided with a driven part, and when a force is applied to the driven part, the first buckle is displaced toward the second mating position.

5. The cold drink making device according to claim 4, wherein the tray body is provided with a containing box protruding from an inner wall of the liquid storage tank, a containing cavity is formed in the containing box, the first buckle is movably arranged in the containing cavity, the containing box is provided with a movable opening, the movable opening is in communication with the containing cavity and the liquid storage tank, the first buckle is capable of extending out from the movable opening to the liquid storage tank, and a wall surface of the tray body is provided with a gap in communication with the containing cavity to expose the driven part.

* * * * *